D. KINZER.
Evaporator.
No. 57,923.  Patented Sept. 11, 1866.
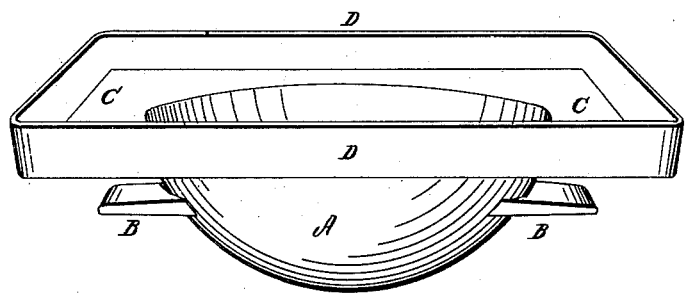
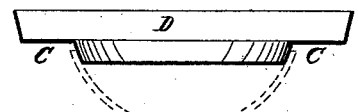
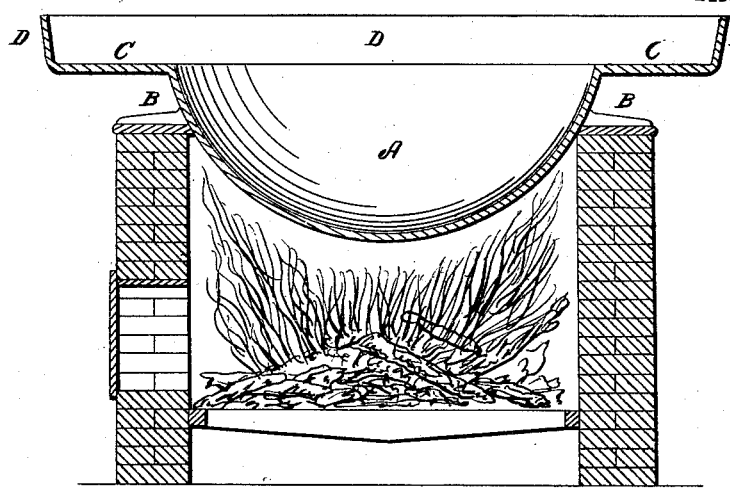
Witnesses:
J. H. Layman.
J. O. Midgee.
Inventor:
D. Kinzer,
By Knight Bros.
Attys.

UNITED STATES PATENT OFFICE.

DAVID KINZER, OF SARDINIA, OHIO.

IMPROVED EVAPORATOR.

Specification forming part of Letters Patent No. 57,923, dated September 11, 1866.

*To all whom it may concern:*

Be it known that I, DAVID KINZER, of Sardinia, Brown county, Ohio, have invented a new and useful Improvement in Sugar-Kettles; and I do hereby declare the following to be a full, clear, and exact description thereof, reference being had to the accompanying drawings, making part of this specification.

This is an improvement in the common hemispherical kettle used for boiling the sap of sorghum, maple, and other saccharine fluids; and my improvement consists in providing the kettle with a marginal ledge or brim adapted to receive and retain the scum, and to permit the clear juice to run back into the kettle.

Figure 1 is a perspective view of my improved kettle. Fig. 2 is an axial section of the same in position on the furnace. Fig. 3 shows by axial section my marginal ledge in separate form for attachment to an ordinary kettle.

A is a kettle-body of customary form. B are lugs for so supporting the same upon the furnace as to leave about one-fourth of the height of the body above the furnace-top. Projecting horizontally outward from the top of the body is a ledge or brim, C, which ledge is inclosed by an elevated margin or rim, D. This appendage I style the "marginal ledge" C D.

I have shown a ledge of square contour and as if cast with the pan, and, in combination with two or more lugs, adapted to support the pan in an elevated position, such being my preferred form; but it is evident that the ledge may have a circular or other form, and that it may be formed separately from the body of either cast or wrought metal, and be attached to a common kettle, (see Fig. 3,) and this in combination or otherwise with lugs at the side of the body.

Operation: The sap or sirup being brought to a boil, the scum, instead of flowing over the outside of the pot and into the fire, spreads onto the marginal ledge and becomes stranded thereupon, the juice running back into the body of the kettle.

The scum may be left upon the ledge until the boiling is completed, or may be easily scraped off at any period of the process by means of the ordinary paddle or other suitable appliance.

This improvement enables the complete inspissation of a batch of sap without intermixture with the crude or green juice of other batches.

My improved scum-collecting kettle is designed more especially for the use of farmers and persons of limited means or appliances.

I claim herein as new and of my invention—

1. The marginal ledge C D, formed upon or adapted to be attached to the common hemispherical boiling-kettle.

2. The kettle A B C D, or its equivalent, as a new article of manufacture.

In testimony of which invention I hereunto set my hand.

DAVID KINZER.

Witnesses:
GEO. H. KNIGHT,
JAMES H. LAYMAN.